United States Patent
Agarwal (10) Patent No.: US 6,974,718 B2
(45) Date of Patent: Dec. 13, 2005

(54) FORMING AN IMAGER ARRAY HAVING IMPROVED COLOR RESPONSE

(75) Inventor: Vishnu K. Agarwal, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/762,299

(22) Filed: Jan. 23, 2004

(65) Prior Publication Data

US 2004/0149887 A1    Aug. 5, 2004

Related U.S. Application Data

(62) Division of application No. 10/305,075, filed on Nov. 27, 2002, now Pat. No. 6,903,394.

(51) Int. Cl.[7] .............................................. H01L 21/00
(52) U.S. Cl. ......................................... 438/57; 438/48
(58) Field of Search .................................... 438/48, 57

(56) References Cited

U.S. PATENT DOCUMENTS

| | | | |
|---|---|---|---|
| 4,942,459 A * | 7/1990 | Hieda et al. ............. | 348/227.1 |
| 6,005,619 A | 12/1999 | Fossum | |
| 6,097,022 A | 8/2000 | Merrill et al. | |
| 6,137,100 A | 10/2000 | Fossum et al. | |
| 6,204,524 B1 | 3/2001 | Rhodes | |
| 6,211,510 B1 | 4/2001 | Merrill et al. | |
| 6,310,366 B1 | 10/2001 | Rhodes et al. | |
| 6,326,652 B1 | 12/2001 | Rhodes | |
| 6,369,853 B1 | 4/2002 | Merrill et al. | |
| 6,407,440 B1 | 6/2002 | Rhodes | |
| 6,410,899 B1 | 6/2002 | Merrill et al. | |
| 6,452,633 B1 | 9/2002 | Merrill et al. | |
| 6,489,992 B2 * | 12/2002 | Savoye ....................... | 348/340 |
| 6,512,544 B1 | 1/2003 | Merrill et al. | |
| 6,512,858 B2 | 1/2003 | Lyon et al. | |
| 6,611,037 B1 | 8/2003 | Rhodes | |
| 6,636,261 B1 | 10/2003 | Pritchard et al. | |
| 2003/0136989 A1 * | 7/2003 | Amiotti et al. ............. | 257/296 |

FOREIGN PATENT DOCUMENTS

| WO | WO-98/19455 | 5/1998 |
|---|---|---|
| WO | WO-99/65248 | 12/1999 |

* cited by examiner

*Primary Examiner*—Allan R. Wilson
(74) *Attorney, Agent, or Firm*—Dickstein Shapiro Morin & Oshinsky LLP (57) ABSTRACT

CMOS image sensors have charge storage capacitors connected to various light sensitive and/or electrical elements. The capacity of the capacitors used for each pixel is tailored to the color to be detected. Charge storage capacitors may be formed entirely over a filed oxide region of the CMOS imager, entirely over an active area of a pixel sensor cell, or partially over a field oxide region and partially over an active pixel area of a pixel sensor cell.

14 Claims, 7 Drawing Sheets

FORMING AN IMAGER ARRAY HAVING IMPROVED COLOR RESPONSE

This application is a divisional of U.S. patent application Ser. No. 10/305,075, filed Nov. 27, 2002, and issued as U.S. Pat. No. 6,903,394.

FIELD OF THE INVENTION

The present invention relates to improved semiconductor imaging devices and, in particular, to a CMOS imager employing a storage capacitor for storing accumulated pixel signals.

BACKGROUND OF THE INVENTION

CMOS imagers have been increasingly used as low cost imaging devices. A fully compatible CMOS sensor technology enabling a higher level of integration of an image array with associated processing circuits is beneficial in many digital imaging applications such as, for example, cameras, scanners, machine vision systems, vehicle navigation systems, video telephones, computer input devices, surveillance systems, auto focus systems and star trackers, among many others.

In a conventional (4T) CMOS imager, the active elements of a pixel cell perform the necessary functions of: (1) photon to charge conversion; (2) accumulation of image charge at a storage node; (3) transfer of charge from the node to an output transistor accompanied by charge amplification; (4) resetting the storage node to a known state before accumulation of image charge and selective output of reset and pixel image signals. A transfer transistor may also be used to transfer charge from a photo conversion element to the output transistor. The photosensitive element of a CMOS imager pixel is typically either a depleted p-n junction photodiode or a field induced depletion region beneath a photogate.

Exemplary CMOS imaging circuits as well as detailed descriptions of the functions of various CMOS elements of an imaging circuit are described, for example, in U.S. Pat. No. 6,204,524 to Rhodes, U.S. Pat. No. 6,310,366 to Rhodes et al., and U.S. Pat. No. 6,326,652 to Rhodes, the disclosures of which are incorporated herein by reference CMOS imagers typically suffer from poor signal-to-noise ratios and poor dynamic range as a result of the inability to fully store and utilize the electric charge collected by the photosensitive area. Consequently, storage capacitors have been proposed for use in connection with the light sensitive node of a CMOS pixel sensor cells to improve collected charge storage. For example, U.S. Pat. No. 6,204,524 to Rhodes describes in detail the formation of planar and trench storage capacitors electrically connected in parallel with the light sensitive node of a CMOS pixel sensor cell.

Storage capacitors may also provide useful results when electrically connected to other light sensitive and/or electrical elements of the pixel sensor cell, such as transistor gates or floating diffusion regions, for example, to affect the operation and characteristics of such various light sensitive and/or electrical elements. Capacitors connected to such various light sensitive and/or electrical elements of the pixel sensor cell help amplify the signal of an imager transistor, increase the storage capacitance of a photosite, or provide a low noise decoupling capacitor. Such storage capacitors are described in co-pending U.S. patent application Ser. No. 10/303.896. filed Nov. 26, 2002, by Howard B. Rhodes and Jeff McKee, entitled "CMOS IMAGER PIXEL DESIGNS", the entire disclosure of which is incorporated herein by reference. While the use of storage capacitors at various locations within a pixel improve pixel operation, those capacitors have the same capacitance value for each pixel color and are not optimized for the photon to charge conversion characteristics of each color pixel.

SUMMARY OF THE INVENTION

The present invention provides CMOS imagers having storage capacitors of selected capacitance connected to various light sensitive and/or electrical elements of a pixel sensor cell of a CMOS imager. The size of each capacitor is optimized based on the color to be detected by the pixel to which it is connected.

Also provided are methods of forming the pixels of CMOS imagers containing charge storage capacitors in which capacitance values are associated with each of the pixel colors.

The presence of a capacitor, and the size of any capacitor employed, is determined based on the color response of the pixel to which the capacitor is connected. Generally, the capacitors fall within the range of 1–50 femtofarads ($10^{-15}$ farads). In an RGB color pixel arrangement, for example, most preferably, red pixels will utilize the smallest capacitors, about 0–20 femtofarads, green pixels will utilize a middle range, about 2–20 femtofarads, and blue pixels will utilize the largest capacitors, about 3–20 femtofarads. The capacitors are sized in relation to the electron production of each colored pixel. Red pixels produce the fewest electrons, and therefore have the smallest, or no, capacitor. Blue pixels produce the most electrons, and therefore have the largest capacitor. Green pixels produce electrons in an amount between red and blue. Sizing the capacitor in relation to electron production allows a greater percentage of each capacitor to be utilized. By employing capacitors sized in relation to the electron production of each color pixel, the sensitivity of each pixel circuit is increased.

Additional advantages and features of the present invention will be apparent from the following detailed description and drawings which illustrate preferred embodiments of the invention.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention.

The terms "wafer" and "substrate" are to be understood as a semiconductor-based material including silicon, silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "wafer" or "substrate" in the following description, previous process steps may have been utilized to form regions or junctions in the base semiconductor structure or foundation. In addition, the semiconductor need not be silicon-based, but could be based on silicon-germanium, germanium, gallium arsenide or other semiconductor material.

The term "pixel" refers to a picture element unit cell containing a photosensor and transistors for converting light radiation to an electrical signal. For purposes of illustration, a representative pixel is illustrated in the figures and description herein and, typically, fabrication of all pixels in an imager will proceed simultaneously in a similar fashion.

Methods of manufacturing the pixels disclosed herein are taught in related U.S. patent application Ser. No. 10/303,896, filed Nov. 26, 2002, in the names of Howard E. Rhodes and Jeff McKee, and entitled "CMOS IMAGER PIXEL DESIGNS," the disclosure of which is incorporated herein by reference.

Figure 1:
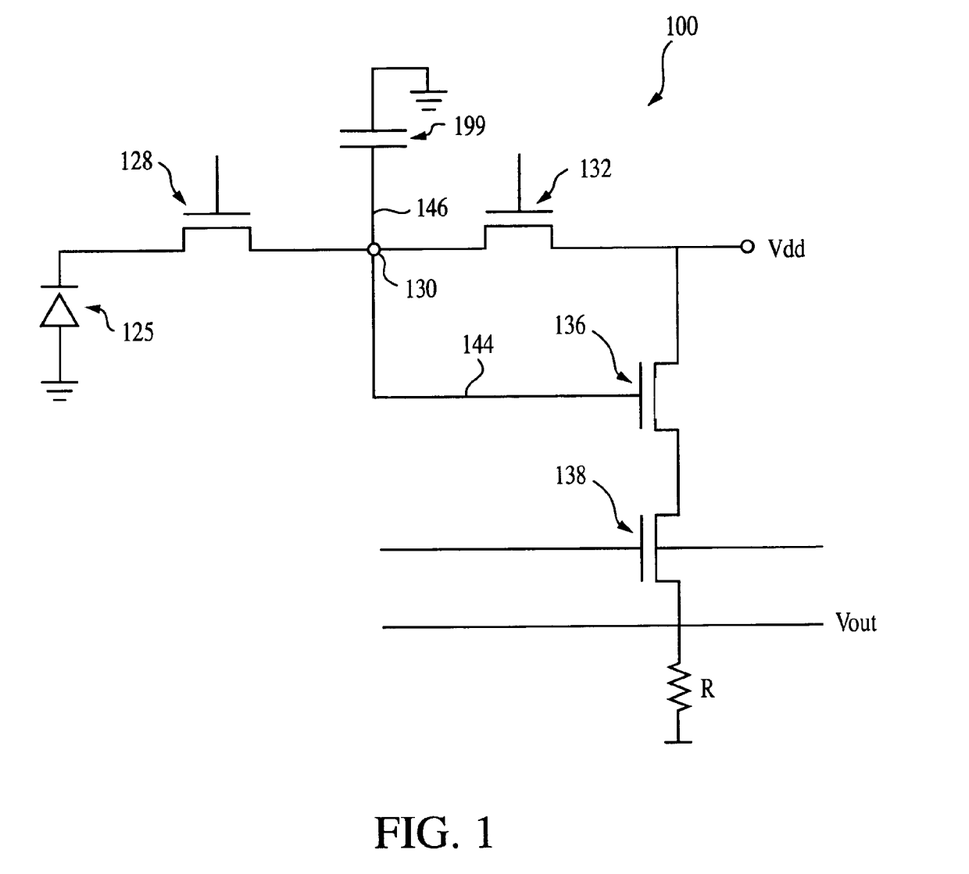
FIG. 1 is a schematic diagram of a pixel sensor cell in accordance with a first embodiment of the present invention.

Referring now to the drawings, where like elements are designated by like reference numerals, FIG. 1 illustrates a first exemplary embodiment of the invention. A pixel sensor cell 100 is illustrated having a storage capacitor 199 overlying a field oxide region, and electrically connected to a floating diffusion region 130 and to ground. As explained in more detail below, storage capacitor 199 is formed so that it does not block any light sensitive areas of the imager. In addition, storage capacitor 199 is formed overlying the field oxide region entirely, without blocking the floating diffusion region 130. Alternatively, however, the storage capacitor 199 also may be formed entirely over the active pixel area, or only partially over the field oxide area and partially over the active area, as desired.

It should be noted that, although the invention will be described below largely in connection with use in a four-transistor (4T) pixel cell which is depicted in FIG. 1, the invention also has applicability to a three-transistor (3T) cell as well as other configurations. The 3T cell differs from the 4T cell in the omission of a charge transfer transistor, as described further below.

Referring to FIG. 1, the storage capacitor 199 is electrically connected between floating diffusion region 130 and ground. Alternatively, capacitor 199 can be connected between floating diffusion region 130 and a voltage source. The four transistors illustrated in FIG. 1 can be identified by their gates, as follows: transfer transistor gate 128, reset transistor gate 132, source follower transistor gate 136 and row select transistor gate 138. In the arrangement shown in FIG. 1, storage capacitor 199 amplifies signals collected by a photo diode 125.

The size of storage capacitor 199 is determined based on the color to be detected by the pixel. According to an exemplary embodiment of the present invention, the pixels form part of an imaging array based on an additive red-green-blue color space. Alternatively, other color arrangements could be utilized, such as a subtractive cyan-yellow-magenta color space.

Figure 9:
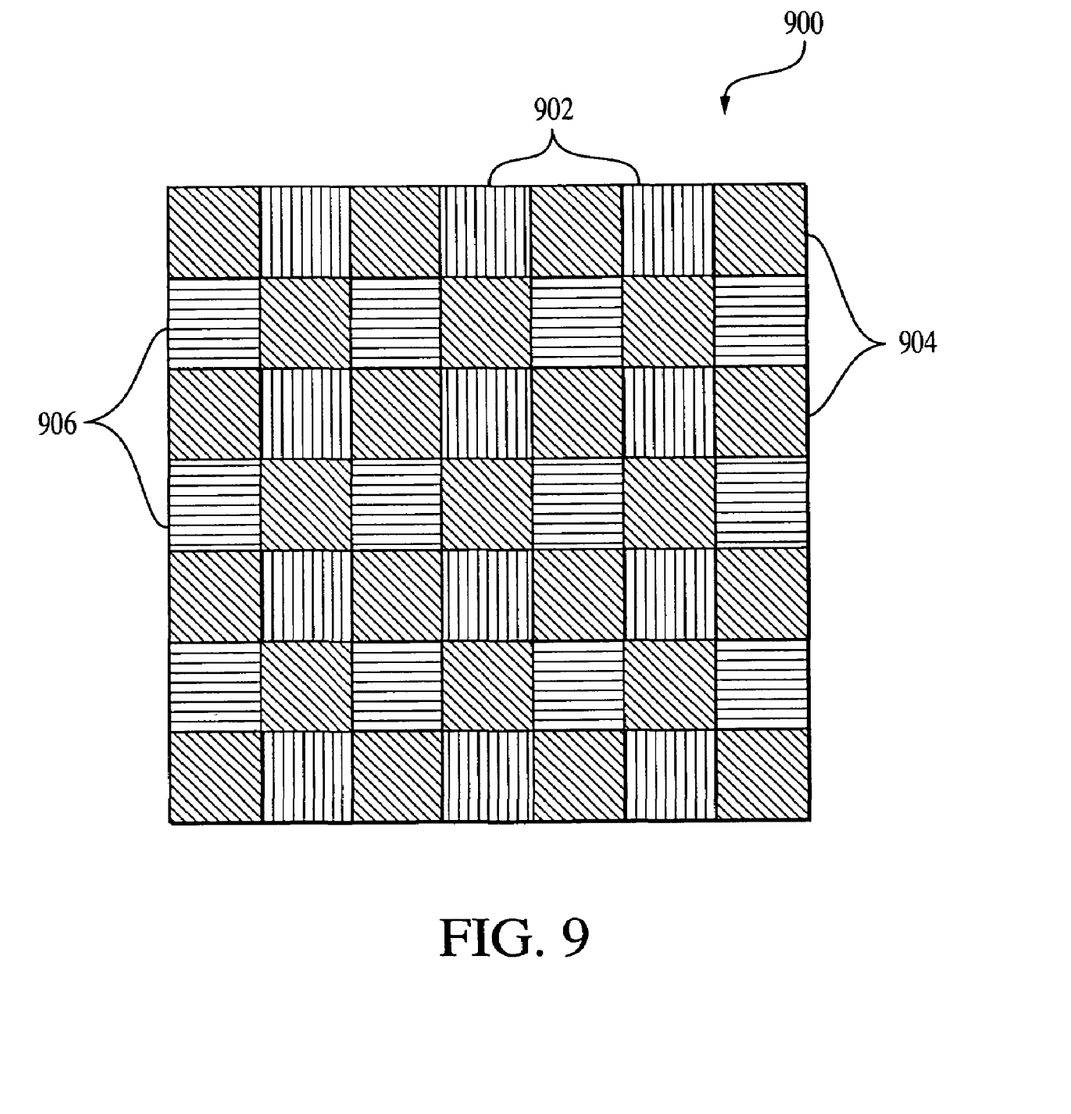
FIG. 9 is an illustration of a Bayer filter used in conjunction with a pixel sensor array of the present invention.

A filter, such as Bayer filter 900 shown in FIG. 9, is arranged over the pixels. The Bayer filter pattern alternates a row of green and red filters with a row of blue and green filters. In FIG. 9, red filters 902 are designated with vertical hatching, green filters 904 are designated with left diagonal hatching, and blue filters 906 are designated with horizontal hatching. The filters provide colored light to each pixel. According to the present invention, pixels designated to detect red light are provided with a storage capacitor 199 having a small size in the range of about 0–20 femtofarads. Pixels designated to detect green light have a medium size in the range of about 2–20 femtofarads. Pixels designated to detect blue light have a large size in the range of about 3–20 femtofarads.

Figure 2:
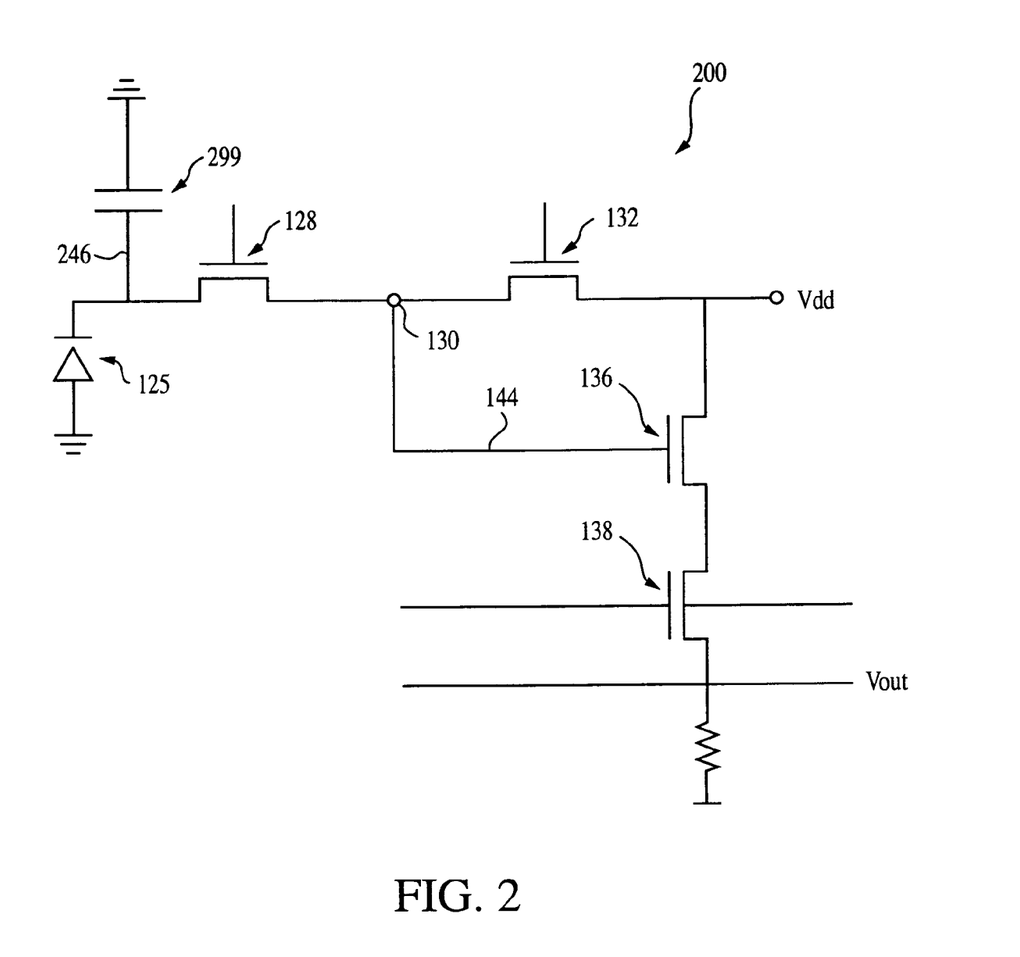
FIG. 2 is a schematic diagram of a pixel sensor cell fabricated in accordance with a second embodiment of the present invention.

The structure of a pixel cell 200 of a second embodiment of the present invention is illustrated with reference to FIG. 2. It should be understood that similar reference numbers correspond to similar elements as previously described with reference to FIG. 1. The structure of FIG. 2 differs from the above-described embodiment in that storage capacitor 299 is formed in contact with the phorodiode 125 and not with the floating diffusion region 130, as in the previous embodiment. Processing of the second embodiment is similar to the processing used to produce the previous embodiment, except that a metal contact is formed that connects an electrode of the storage capacitor 299 to a doped transfer region of the photodiode, and not to the floating diffusion region 130, as in the above-described embodiment. Again, the storage capacitor 299 may be formed entirely or only partially over the field oxide region as well as entirely or only partially over the active area of the pixel sensor cell. If the storage capacitor 299 is formed entirely over the field oxide region, the advantage is that the storage capacitor 299 improves the charge storage capacity of the imager without reducing the size of the photosensitive area.

Once again, the capacitor 299 is sized in accordance with the color of the pixel in the manner described above with reference to FIG. 1. Thus, capacitor 299, for pixels designated to detect red light, has a small size in the range of 0–20 femtofarads. In pixels designated to detect green light, capacitor 299 has a medium size in the range of about 2–20 femtofarads. In pixels designated to detect blue light, capacitor 299 has a large size in the range of 3–20 femtofarads.

Figure 3:
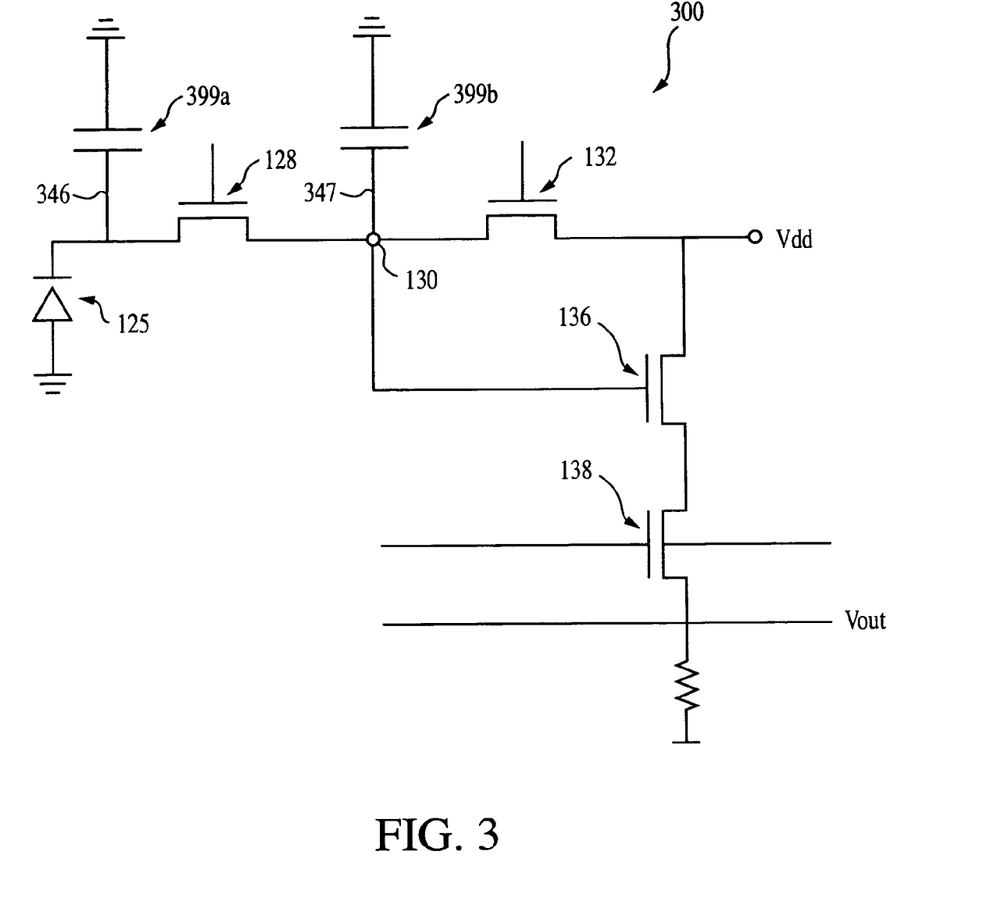
FIG. 3 is a schematic diagram of a pixel sensor cell fabricated in accordance with a third embodiment of the present invention.

FIG. 3 illustrates yet another embodiment of the present invention according to which two different storage capacitors are connected to two different elements of pixel sensor cell 300. For example, FIG. 3 depicts storage capacitor 399a, which is connected to the photodiode 125, and storage capacitor 399b, which is connected to the floating diffusion region 130. Both storage capacitors 399a, 399b of pixel sensor cell 300 (FIG. 3) may be formed totally overlying the field oxide region, without reducing the photosensitive area of the pixel cell, or only partially over the field oxide region. Storage capacitors 399a, 399b of pixel sensor cell 300 also may be formed totally overlying the photosensitive area of the pixel cell, or only partially over the active area.

Once again, the capacitors 399a, 399b are sized in accordance with the color of the pixel in the manner described above with reference to FIG. 1. Thus, capacitors 399a, 399b for pixels designated to detect red light, have a small size combined in the range of 0–20 femtofarads. In pixels designated to detect green light, capacitor 399a, 399b have a medium size in the range of about 2–20 femtofarads. In pixels designated to detect blue light, capacitor 399a, 399b have a large size in the range of 3–20 femtofarads.

The processing for the formation of the storage capacitors 399a, 399b of pixel sensor cell 300 of FIG. 3 are similar to the processing steps for the embodiment described above, except that two capacitors (and not one capacitor) are formed over the field oxide region. In addition, contact 346 (FIG. 3) and contact 347 (FIG. 3) connect each of the lower electrodes of the storage capacitors 399a, 399b to the doped transfer region and to the floating diffusion region 130, respectively. Preferably, contacts 346, 347 are formed of a conductive material, such as doped polysilicon, or a metal such as titanium/titanium nitride/tungsten. Photolithographic techniques are used to define the areas to be etched out to form the holes for the contacts 346, 347 wherein the conductive material is subsequently depositing therein.

Although FIG. 3 illustrates only two storage capacitors 399a, 399b, it must be understood that the present invention is not limited to this embodiment. Accordingly, the invention contemplates the formation of a plurality of such storage capacitors which are formed entirely or only partially over the field oxide region, and which are further connected to various light sensitive and/or electrical elements of the pixel sensor cell. The combined capacitances of the storage capacitors is selected based on the color to be detected by the associated pixel.

Figure 4:
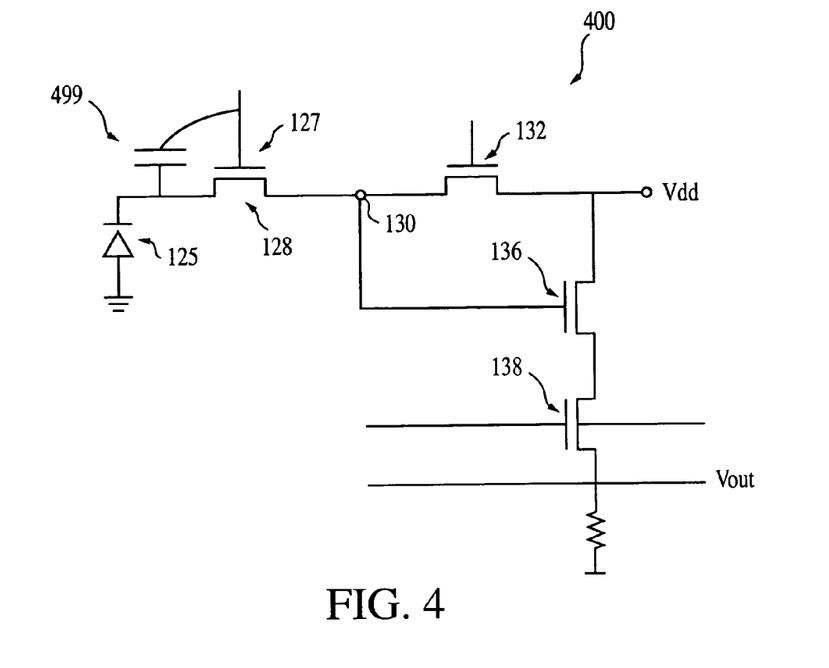
FIG. 4 is a schematic diagram of a pixel sensor cell fabricated in accordance with a fourth embodiment of the present invention.
Figure 5:
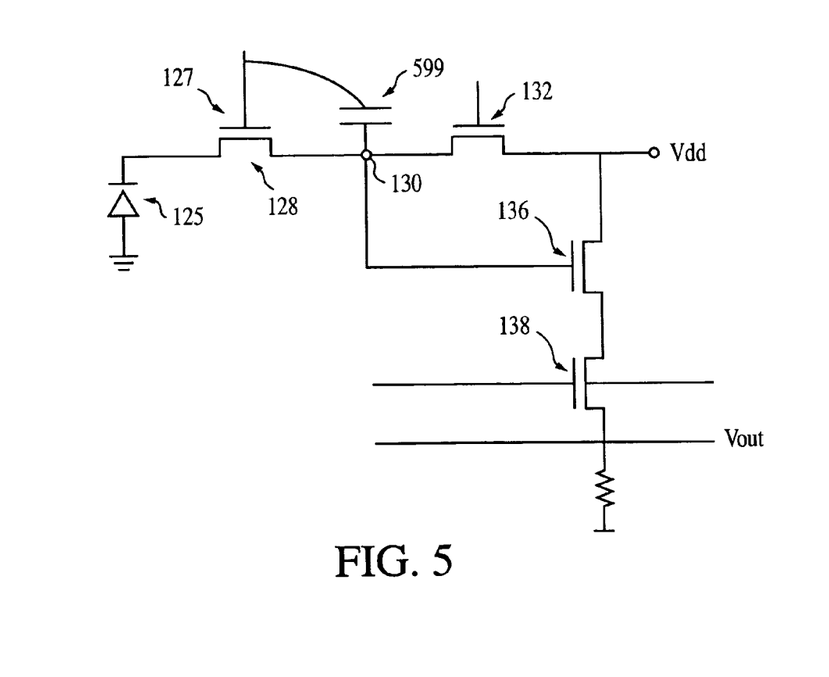
FIG. 5 is a schematic diagram of a pixel sensor cell fabricated in accordance with a fifth embodiment of the present invention.
Figure 6:
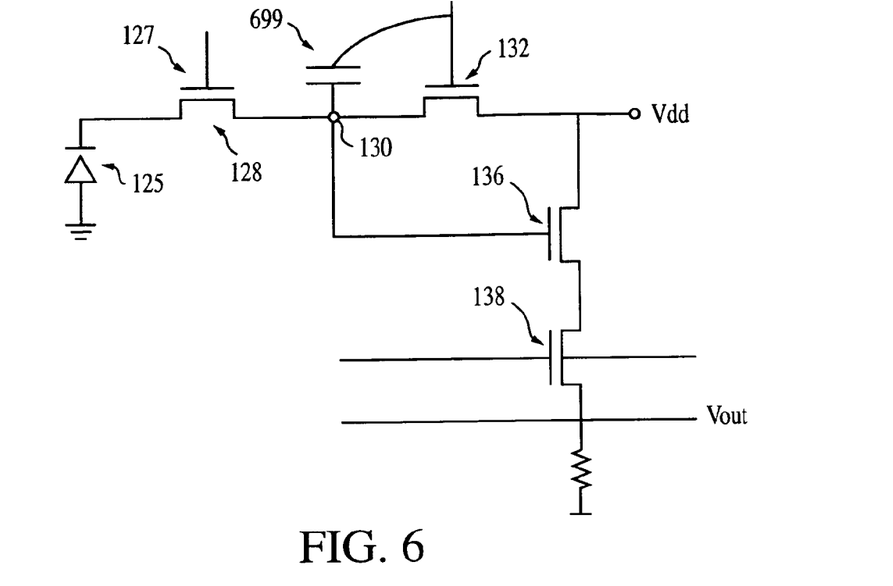
FIG. 6 is a schematic diagram of a pixel sensor cell fabricated in accordance with a sixth embodiment of the present invention.

FIGS. 4–6 illustrate additional embodiments of the present invention, according to which a storage capacitor is connected not to a ground source, as in the previous embodiments, but rather to a gate of one of the four transistors of the 4T cell. For example, FIG. 4 illustrates storage capacitor 499 formed entirely or partially over the field oxide region, and connected to both the photodiode 125 and to the gate stack 127 of transfer transistor 128. In another exemplary embodiment, FIG. 5 depicts storage capacitor 599 formed over the field oxide region and also connected to both the floating diffusion region 130 and to the gate stack 127 of transfer transistor 128. According to yet another exemplary embodiment, storage capacitor 699 of FIG. 6 is formed over the field oxide region and is further connected to both the floating diffusion region 130 and to a gate of reset transistor 132.

Thus, capacitors 499, 599, and 699 for pixels designated to detect red light, each have a small size in the range of 0–20 femtofarads. In pixels designated to detect green light, capacitors 499, 599 and 699 have a medium size in the range of about 2–20 femtofarads. In pixels designated to detect blue light, capacitors 499, 599 and 699 have a large size in the range of 3–20 femtofarads.

Figure 7:
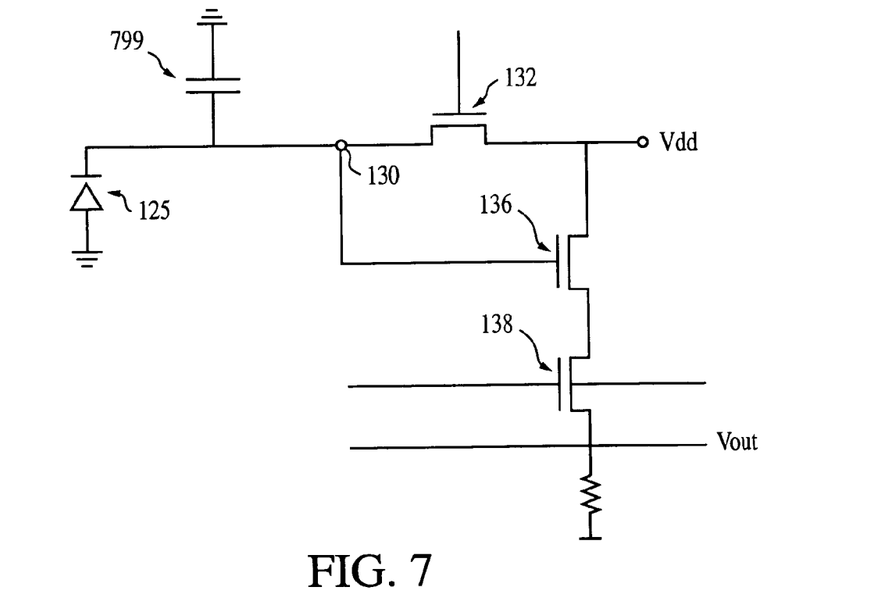
FIG. 7 is a schematic diagram of a pixel sensor cell fabricated in accordance with a seventh embodiment of the present invention.

Thus, capacitor 799 for pixels designated to detect red light, have a small size in the range of 0–20 femtofarads. In pixels designated to detect green light, capacitor 799 has a medium size in the range of about 2–20 femtofarads. In pixels designated to detect blue light, capacitor 799 has a large size in the range of 3–20 femtofarads.

In each of the embodiments depicted in FIGS. 4–6, the processing steps for the fabrication of the storage capacitors 499, 599, and 699 are similar to the processing steps used to manufacture the other embodiments, except that the upper electrode of each of the storage capacitors 499, 599, and 699 is connected not to a ground potential, as in the first embodiment, but rather to another element of the CMOS imager, for example, a gate of one of the four transistors of the pixel sensor cell, as described above.

FIG. 7 illustrates yet another embodiment of the present invention, according to which a storage capacitor 799 is formed over the field oxide region 115 as part of a three-transistor (3T) cell and not a four-transistor (4T) cell, as previously described with reference to FIG. 2, for example. The only difference between the structure of FIG. 7 and that of FIG. 2 is that the structure of FIG. 2 contains an additional fourth transistor, that is transfer transistor 128. Thus, storage capacitor 799 of FIG. 7 may be also formed entirely or only partially over the field oxide region 115 and connected to the photodiode 125 and the floating diffusion region 130. The processing steps for the fabrication of the storage capacitor 799 are similar to the processing steps required to manufacture the other embodiments described above, except that the storage capacitor 799 is formed by itself over the field oxide region, and not simultaneously with the transfer gate of the transfer transistor.

A typical processor system 600, which includes a CMOS image sensor 42 having an array of pixels having the construction described above as shown in FIG. 8. The processor system is exemplary of a system having digital circuits which could include a CMOS image sensor. Without being limiting, such a system could include a computer system, camera system, scanner, machine vision, vehicle navigation, video phone, surveillance system, auto focus system, star tracker system, motion detection system, image stabilization system and data compression system for high-definition television, all of which can utilize the present invention.

Figure 8:
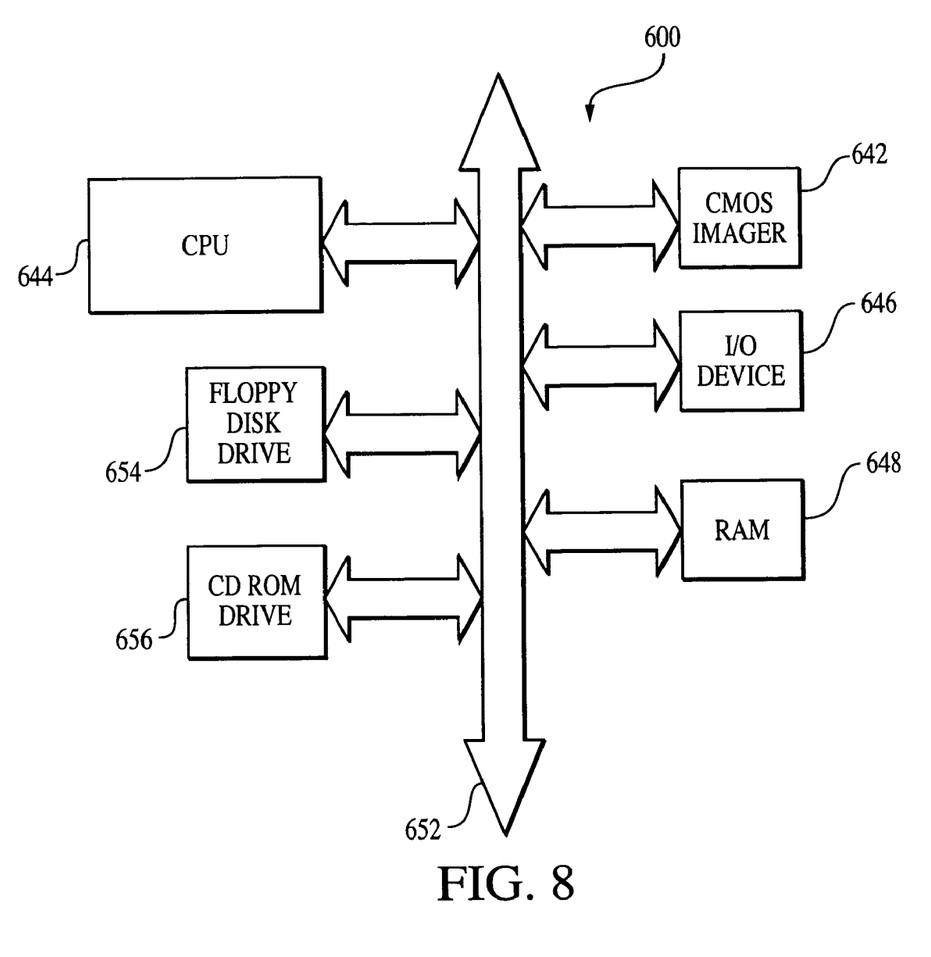
FIG. 8 is an illustration of a processing system utilizing the pixel sensor cells of the present invention.

A processor system, such as a computer system, for example generally comprises a central processing unit (CPU) 644, for example, a microprocessor, that communicates with one or more input/output (I/O) devices 646 over a bus 652. The CMOS image sensor 642 also communicates with the system over bus 652. The computer system 600 also includes random access memory (RAM) 648, and, in the case of a computer system may include peripheral devices such as a floppy disk drive 654, and a compact disk (CD) ROM drive 656 or a flash memory card 657 which also communicate with CPU 644 over the bus 652. It may also be desirable to integrate the processor 654, CMOS image sensor 642 and memory 648 on a single IC chip.

The above description and drawings are only to be considered illustrative of exemplary embodiments, which achieve the features and advantages of the invention. Modification and substitutions to specific process conditions and structures can be made without departing from the spirit and scope of the invention. Accordingly, the invention is not to be considered as being limited by the foregoing description and drawings, but is only limited by the scope of the appended claims.

It should be noted again that, although the invention has been described with specific reference to CMOS imaging circuits having a photogate and a floating diffusion region, the invention has broader applicability and may be used in any CMOS imaging apparatus. Also, although exemplary capacitor structures have been described and illustrated, many variations in capacitor structures could be made. Similarly, the processes described above are only exemplary of many that could be used to produce the invention. For example, although the invention has been described above

What is claimed as new and desired to be protected by Letters Patent of the United States is:

1. A method of forming an imager pixel array comprising the steps of:
   forming at least three photosensors each responsive to a different color of light; and
   forming a plurality of charge storage capacitors, each with different storage capacity respectively associated with one of said photosensors, a storage capacity of each said charge storage capacitor corresponding in proportion to a relative electron production capability of said respectively associated photosensor.

2. A method according to claim 1, wherein a portion of said at least three photosensors is responsive to red color light, and said charge storage capacitor respectively associated with each said photosensor of said portion is formed with a storage capacity of between about 0 and about 20 femtofarads.

3. A method according to claim 1, wherein a portion of said at least three photosensors is responsive to green color light, and said charge storage capacitor respectively associated with each said photosensor of said portion is formed with a storage capacity of between about 2 and about 20 femtofarads.

4. A method according to claim 1, wherein a portion of said at least three photosensors is responsive to blue color light, and said charge storage capacitor respectively associated with each said photosensor of said portion is formed with a storage capacity of between about 3 and about 20 femtofarads.

5. A method according to claim 1, wherein each said charge storage capacitor is formed as a flat plate capacitor.

6. A method according to claim 1, further comprising forming a plurality of transfer transistors each in electrical communication with a respective one of said plurality of storage capacitors.

7. A method according to claim 1, wherein the step of forming said plurality of charge storage capacitors comprises establishing electrical communication for receiving collected charges directly from said respectively associated photosensors.

8. A method according to claim 1, wherein the step of forming said plurality of charge storage capacitors comprises establishing electrical communication for receiving collected charges from said respectively associated photosensors through a respective floating diffusion region which receives charges from said respectively associated respective one of said plurality of photosensors.

9. A method of forming an imager pixel array comprising the steps of:
   providing a plurality of photosensors comprising at least a first portion responsive to a first color of light, a second portion responsive to a second color of light, and a third portion responsive to a third color of light; and
   forming a plurality of storage capacitors, each with different storage capacity in electrical communication with a respective photosensor of said first, second, and third portions of said plurality of photosensors, a storage capacity of each said storage capacitor corresponding in proportion with a relative electron production capability of each said respective photosensor.

10. A method as in claim 9, wherein the first color is red, a respective storage capacitor in electrical communication with a photosensor of said first portion having a storage capacity of between about 0 and about 20 femtofarads.

11. A method as in claim 9, wherein the second color is green, and a respective storage capacitor in electrical communication with a photosensor of said second portion having a storage capacity of between about 2 and about 20 femtofarads.

12. A method as in claim 9, wherein said third color of light is blue and a storage capacitor in electrical communication with a photosensor of said third portion has a storage capacity of between about 3 and about 20 femtofarads.

13. A method as in claim 9, wherein the first color is red, a respective storage capacitor in electrical communication with a photosensor of said first portion having a storage capacity of between about 0 and about 20 femtofarads, the second color is green, and a respective storage capacitor in electrical communication with a photosensor of said second portion having a storage capacity of between about 2 and about 20 femtofarads, and said third color of light is blue and a storage capacitor in electrical communication with a photosensor of said third portion has a storage capacity of between about 3 and about 20 femtofarads.

14. A method of forming an imager pixel array comprising the steps of:
   forming at least three photosensors each responsive to a different color of light; and
   forming a plurality of charge storage capacitors, each with different storage capacity respectively associated with one of said photosensors, a storage capacity of each said charge storage capacitor corresponding in proportion to a relative electron production capability of said respectively associated photosensor, wherein a first portion of said at least three photosensors is responsive to red color light, and said charge storage capacitor respectively associated with each said photosensor of said first portion is formed with a storage capacity of between about 0 and about 20 femtofarads, a second portion of said at least three photosensors is responsive to green color light, and said charge storage capacitor respectively associated with each said photosensor of said second portion is formed with a storage capacity of between about 2 and about 20 femtofarads, and a third portion of said at least three photosensors is responsive to blue color light, and said charge storage capacitor respectively associated with each said photosensor of said third portion is formed with a storage capacity of between about 3 and about 20 femtofarads.

* * * * *